(12) United States Patent
Ohtsu et al.

(10) Patent No.: US 8,270,610 B2
(45) Date of Patent: Sep. 18, 2012

(54) WIRELESS COMMUNICATION SYSTEM, WIRELESS COMMUNICATION APPARATUS, AND METHOD OF EXCHANGING CRYPTOGRAPHY KEY BETWEEN WIRELESS COMMUNICATION APPARATUSES

(75) Inventors: Tomohiko Ohtsu, Kanagawa (JP); Yoshiyuki Tomoda, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 1273 days.

(21) Appl. No.: 11/808,308

(22) Filed: Jun. 8, 2007

(65) Prior Publication Data

US 2007/0291946 A1 Dec. 20, 2007

(30) Foreign Application Priority Data

Jun. 20, 2006 (JP) .................................. 2006-169601

(51) Int. Cl.
*H04K 1/00* (2006.01)
(52) U.S. Cl. ......... 380/270; 380/259; 380/278; 713/168
(58) Field of Classification Search .................. None
See application file for complete search history.

(56) References Cited

U.S. PATENT DOCUMENTS

| | | | |
|---|---|---|---|
| 7,298,850 B2 * | 11/2007 | Whytock ...................... | 380/277 |
| 7,600,113 B2 * | 10/2009 | Kuehnel et al. ............... | 713/155 |
| 2003/0097340 A1 * | 5/2003 | Okamoto et al. ............... | 705/65 |
| 2008/0007773 A1 | 1/2008 | Imae | |

FOREIGN PATENT DOCUMENTS

| | | |
|---|---|---|
| JP | 2003-283481 | 10/2003 |
| JP | 2005-45582 | 2/2005 |
| JP | 2005-318079 | 11/2005 |
| JP | 2008-22525 | 1/2008 |

OTHER PUBLICATIONS

"Wireless Universal Serial Bus Specification", May 12, 2005, pp. 119-136.*
"Wireless Universal Serial Bus Specification Revision 1.0", Chapter 6, pp. 119-136, <Internet URL: http://www.usb.org/developers/wusb/>, May 7, 2007.
Notice of Reasons for Rejection issued Dec. 6, 2011 by the Japanese Patent Office in Japanese Patent Application No. 2006-169601 with English translation.

* cited by examiner

*Primary Examiner* — Shewaye Gelagay
(74) *Attorney, Agent, or Firm* — Young & Thompson

(57) ABSTRACT

A wireless communication system includes first and second communication apparatuses transmitting/receiving encrypted communication data by radio. The first includes: a first encrypting/decrypting unit encrypting communication data and decrypting encrypted communication data; a first interface unit electrically connectable with a portable non-volatile memory (NVRAM), to which the NVRAM can be physically removably inserted; and a first cryptography key processing unit generating a temporary cryptography key used for encrypting/decrypting the communication data and a master cryptography key for generating the temporary cryptography key. The second communication apparatus includes: a second encrypting/decrypting unit encrypting the communication data and decrypting the encrypted communication data; a second interface unit electrically connectable with the NVRAM, to which the NVRAM storing the master cryptography key is physically removably inserted; and a second cryptography key processing unit generating the temporary cryptography key based on the master cryptography key read from the NVRAM connected with the second interface unit.

9 Claims, 6 Drawing Sheets

121

| DEVICE ID (CDID) | CONNECTION KEY (CK) |
|---|---|
| CDID_11 | CK_11 |
| CDID_12 | CK_12 |
| ⋮ | ⋮ |

| HOST ID (CHID) | DEVICE ID (CDID) | CONNECTION KEY (CK) |
|---|---|---|
| CHID_11 | CDID_11 | CK_11 |
| CHID_21 | CDID_21 | CK_21 |
| ⋮ | ⋮ | ⋮ |

Fig. 3B

WIRELESS COMMUNICATION SYSTEM, WIRELESS COMMUNICATION APPARATUS, AND METHOD OF EXCHANGING CRYPTOGRAPHY KEY BETWEEN WIRELESS COMMUNICATION APPARATUSES

BACKGROUND OF THE INVENTION

1. Field of the Invention

The present invention relates to a wireless communication system and a wireless communication apparatus. In particular, the invention relates to a method of exchanging a cryptography key between wireless communication apparatuses.

2. Description of Related Art

Wireless data communications are more adapted to mobile communication environments than wired data communications. On the other hand, the wireless data communications are disadvantageous in that communication data can be easily stolen or tampered. As one popular solution to this problem, in a wireless communication system transmitting/receiving communication data through a wireless interface, the communication data is encrypted and then transmitted/received.

According to this method, even if stolen midway through a transmission path, the encrypted communication data cannot be decrypted unless a cryptography key used for encryption is obtained. Thus, a high security level of the wireless communication system is ensured by encrypting communication data.

Security specification of a wireless USB (Universal Serial Bus) is described in "Wireless Universal Serial Bus Specification Revision 1.0", Chapter 6, pp. 119-136. The wireless USB employs a common key encryption system, and allows transmission/reception encrypted communication data between a WUSB host and a WUSB device with a common private key. The communication data is encrypted based on AES-128CCM (Advanced Encryption Standard-128 bit Counter-mode with CBC MAC Protocol).

To elaborate, information called "Connection Context" is shared between the WUSB host and the WUSB device. The connection context includes three kinds of information: a host ID (CHID: Connection Host ID), a device ID (CDID: Connection Device ID), and a connection key (CK: Connection Key). The connection context varies from one pair of WUSB host and WUSB device to another.

A PTK (Pair-wise Temporal Key) is generated based on a connection key CK shared between the WUSB host and the WUSB device. The communication data is encrypted and decrypted between the WUSB host and the WUSB device based on the pair-wise temporal key PTK.

As described above, the wireless USB requires sharing of connection key CK between the WUSB host and the WUSB device. Various methods have been proposed for sharing the connection key CK. To be specific, there have been proposed a method of transferring a cryptography key from a host to a device via a connection cable as disclosed in Japanese Unexamined Patent Application Publication No. 2005-318079, and a method of transferring a cryptography key with a communication mode such as an infrared or optical communication mode where light travels in a straight line, or with weak radio waves as disclosed in Japanese Unexamined Patent Application Publication No. 2003-283481.

The method with use of the connection cable as disclosed in Japanese Unexamined Patent Application Publication No. 2005-318079 needs to reduce a distance between the WUSB host and the WUSB device to a distance shorter than the connection cable length. Therefore, if it is difficult to bring the WUSB host and the WUSB device closer together due to any obstacle therebetween or if the WUSB host or WUSB device is not easy to carry, a problem arises.

On the other hand, the method of transferring a cryptography key with a communication mode such as an infrared or optical communication mode where light travels in a straight line, or with weak radio waves as disclosed in Japanese Unexamined Patent Application Publication No. 2003-283481 has a problem that the cryptography key is transmitted by radio waves propagating in the air, so a fear about decryption of the cryptography key, spoofing, or tampering of the cryptography key through radio intercept cannot be completely cast aside.

Incidentally, these problems are not involved in the above WUSB wireless communication system alone. That is, the problems would occur in all wireless communication systems that need to exchange a so-called cryptography key used for encrypting/decrypting communication data between two wireless communication apparatus to share the cryptography key.

SUMMARY

The present invention seeks to solve one or more of the above problems. In one embodiment, a wireless communication system includes a first communication apparatus and a second communication apparatus transmitting/receiving encrypted communication data by radio. The first communication apparatus includes: a first encrypting/decrypting unit encrypting the communication data and decrypting the encrypted communication data; a first interface unit electrically connectable with a portable nonvolatile memory, to which the nonvolatile memory can be physically removably inserted; and a first cryptography key processing unit generating a temporary cryptography key used for encrypting/decrypting the communication data and a master cryptography key for generating the temporary cryptography key. The second communication apparatus includes: a second encrypting/decrypting unit encrypting the communication data and decrypting the encrypted communication data; a second interface unit electrically connectable with the nonvolatile memory, to which the nonvolatile memory storing the master cryptography key is physically removably inserted; and a second cryptography key processing unit generating the temporary cryptography key based on the master cryptography key read from the nonvolatile memory connected with the second interface unit.

According to such configuration, a master cryptography key sharable between first and second communication apparatuses is written to a nonvolatile memory physically inserted to a first interface unit, and then the nonvolatile memory is removed from the first interface unit. Next, the nonvolatile memory is physically inserted to a second interface unit of a second communication apparatus to thereby transmit a master cryptography key to the second communication apparatus. Thus, it is possible to share a master cryptography key between first and second communication apparatuses and execute easy and safe transmission of a cryptography key. Further, a portable nonvolatile memory is used for transmitting a cryptography key, so there is no limitation on a distance as in the case of transmission with a connection cable.

According to the above aspect of the present invention, it is possible to provide a wireless communication system, a wireless communication apparatus, and a method of exchanging a cryptography key between wireless communication apparatuses, which can share a master cryptography key between wireless communication apparatuses through low-risk and safe transmission of a cryptography key free from limitations on a distance as in the case of transmission with a connection cable.

BRIEF DESCRIPTION OF THE DRAWINGS

The above and other objects, advantages and features of the present invention will be more apparent from the following description of certain preferred embodiments taken in conjunction with the accompanying drawings, in which:

FIGS. 3A and 3B show a control table example held in a WUSB host and a WUSB device of the first embodiment;

DETAILED DESCRIPTION OF THE PREFERRED EMBODIMENTS

Figure 1:
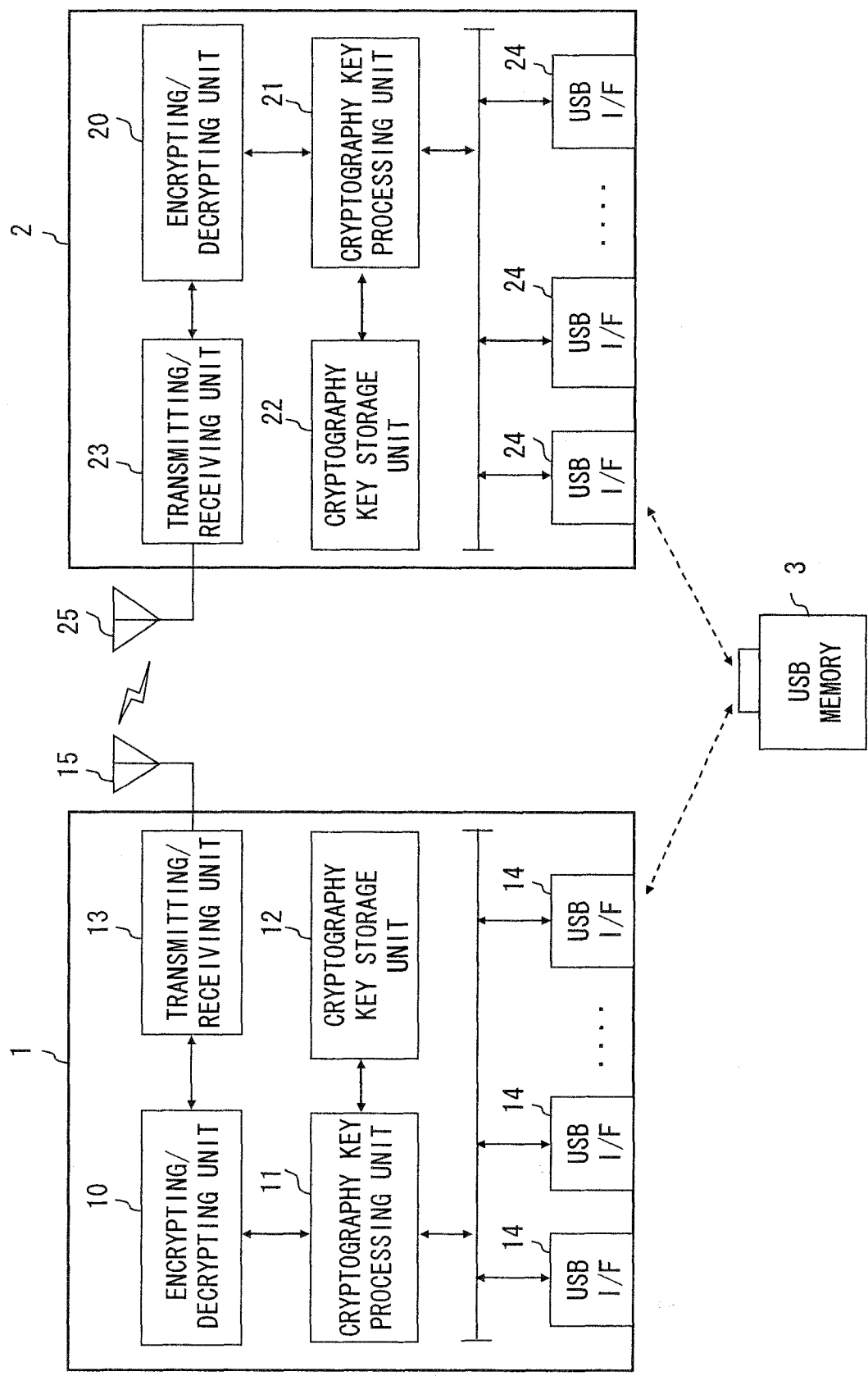
FIG. 1 is a block diagram of a wireless communication system according to a first embodiment of the present invention.

The invention will be now described herein with reference to illustrative embodiments. Those skilled in the art will recognize that many alternative embodiments can be accomplished using the teachings of the present invention and that the invention is not limited to the embodiments illustrated for explanatory purposes.

In the accompanying drawings, the same components are denoted by identical reference numerals, and repetitive description thereof is omitted for clear description if not necessary. Incidentally, the following embodiments of the present invention describe a WUSB communication system to which the present invention is applied.

First Embodiment

An embodiment of the present invention is described below. FIG. 1 is a block diagram of configuration of a WUSB communication system according to a first embodiment of the present invention. Referring to FIG. 1, the WUSB communication system of this embodiment includes a WUSB host 1 and a WUSB device 2, which communicate with each other by radio through the antennas 15 and 25, and a USB memory 3 inserted into USB interfaces (I/Fs) 14 and 24 of the between the WUSB host 1 and the WUSB device 2 and used for writing/reading a cryptography key.

A transmitting/receiving unit 13 transmits/receives communication data to/from the WUSB device 2 through the antenna 15. An encrypting/decrypting unit 10 encrypts transmission data and outputs the encrypted data to the transmitting/receiving unit 13 as well as decrypts data received with the transmitting/receiving unit 13 based on a cryptography key to authenticate decrypted data.

Further, a cryptography key processing unit 11 generates a connection key CK as a common private key between the WUSB host 1 and the WUSB device 2. Further, the cryptography key processing unit 11 generates a pair-wise temporal key PTK used for encrypting/decrypting communication data based on the connection key CK. The above connection key CK and pair-wise temporal key PTK are stored in a cryptography key storage unit 12. In addition, the WUSB host 1 includes at least one USB interface 14 conforming to wired USB standards (USB2.0).

Here, the antenna 15 is provided outside the WUSB host 1 in FIG. 1 but may be integrated with the WUSB host 1. Further, the encrypting/decrypting unit 10, the cryptography key processing unit 11, and other such circuit blocks may be composed of gate-level circuits, or a processor such as a DSP (Digital Signal Processor) and a program module executed on the processor. Specifically speaking, the configuration can be designed based on the progress of fine-patterning in a semiconductor process, a demand for flexibility in software processing, and necessary operating speed in a comprehensive manner.

On the other hand, the WUSB device 2 of FIG. 1 includes a transmitting/receiving unit 23, an encrypting/decrypting unit 20, a cryptography key processing unit 21, a cryptography key storage unit 22, and a USB I/F 24. The transmitting/receiving unit 23 transmits/receives communication data to/from the WUSB host 1 through the antenna 25. The encrypting/decrypting unit 20 encrypts transmission data and outputs the encrypted data to the transmitting/receiving unit 23 as well as decrypts data received with the transmitting/receiving unit 23 based on a cryptography key to authenticate the decrypted data.

Further, the cryptography key processing unit 21 generates a pair-wise temporal key PTK for encrypting/decrypting communication data based on a connection key CK as a common private key between the WUSB host 1 and the WUSB device 2. The cryptography key storage unit 22 is able to store the connection key CK and the pair-wise temporal key PTK. Further, the WUSB device 2 includes at least one USB interface 24 conforming to the wired USB standards (USB2.0).

The USB memory 3 of FIG. 1 is a nonvolatile memory including a USB interface (USB I/F) conforming to the wired USB standards (USB2.0). The USB memory 3 is physically inserted into the USB I/F 14 of the WUSB host 1 and the USB I/F 24 of the WUSB device to thereby electrically connect between the USB I/Fs 14 and 24. To be specific, the USB I/F of the USB memory 3 includes an A-type plug physical connector, and the USB I/F 14 of the WUSB host 1 and the USB I/F 24 of the WUSB device include A-type receptacle physical connector.

Incidentally, one WUSB host 1 and one WUSB device 2 are shown in FIG. 1 for ease of illustration, but one WUSB host 1 can communicate with plural WUSB devices 2. Further, the WUSB device 2 can be switchably connected with one of the WUSB hosts 1.

Next, description is given of 4-way handshake executed between the WUSB host 1 and the WUSB device 2 for authentication. Incidentally, in this example, the WUSB host 1 and the WUSB device 2 are assumed to have a same connection key CK.

(1) The WUSB host 1 transmits a TKID as ID number of the pair-wise temporal key PTK and HNonce as a 128-bit random number generated with the cryptography key processing unit 11 to the WUSB device 2. Likewise, the cryptography key processing unit 21 of the WUSB device 2 generates DNonce as a 128-bit random number. Then, the cryptography key processing unit 21 generates a pair-wise temporal key PTK based on the connection key CK, HNonce sent from the WUSB host 1, and DNonce generated with the WUSB device 2.

(2) The WUSB device 2 transmits an MIC (Message Integrity Code) calculated based on the ID number TKID, the 128-bit random number DNonce, and a KCK (Key Confirmation Key) for preventing tamper to the WUSB host 1. The WUSB host 1 generates a pair-wise temporal key PTK and a key KCK based on the connection key CK, and the 128-bit random numbers HNonce and DNonce. Further, the WUSB host 1 authenticates the validity of the MIC received from the WUSB device 2 based on the generated KCK. If the MIC is verified as a result of the authentication, it is determined that data is not tampered in a transfer path from the WUSB device 2 to the WUSB host 1. Thus, the WUSB host 1 determines that the WUSB device 2 has the same key as its own pair-wise temporal key PTK.

(3) The WUSB host 1 calculates an MIC based on the ID number TKID, the 128-bit random number HNonce, and the KCK generated with the WUSB host 1 and then transmits the calculated MIC to the WUSB device 2. Next, if the WUSB device 2 verifies the MIC sent from the WUSB host 1 through authentication, it is determined that data is not tampered and the WUSB host 1 has the same key as its own pair-wise temporal key PTK.

(4) The WUSB device 2 notifies the WUSB host 1 that the device starts using the pair-wise temporal key PTK.

In this way, the WUSB host 1 and the WUSB device 2 confirm to have the same master key, that is, the connection key CK. Then, the WUSB host 1 and the WUSB device 2 each generate a pair-wise temporal key PTK used for encrypting/decrypting transmission/reception data.

The encrypting/decrypting unit 10 of the WUSB host 1 encrypts transmission data based on the pair-wise temporal key PTK and outputs the encrypted data to the transmitting/receiving unit 13. The transmitting/receiving unit 13 subjects the encrypted data to scrambling, convolutional coding, interleaving, data mapping, IEFT (Inverse Fast Fourier Transform), D/A conversion, and RF modulation, and then output as a transmission signal to the antenna 15.

On the other hand, the transmitting/receiving unit 23 of the WUSB device 2 amplifies the RF signal input from the antenna 25, converts the amplified RF signal into an IF signal, selects a frequency of the IF signal with a tuner, and converts the IF signal into a digital signal with an A/D converter. Then, a digital quadrature demodulator circuit quadrature-demodulates the digitalized IF signal to output signals obtained by carrying out FFT on an I channel signal and a Q channel signal, which are separated from the IF signal, with a fast Fourier transform (FFT) circuit to the encrypting/decrypting unit 20.

The encrypting/decrypting unit 20 decodes the data input from the transmitting/receiving unit 23 based on a pair-wise temporal key PTK. Incidentally, the pair-wise temporal key PTK is generated with the cryptography key processing unit 21 and stored in the cryptography key storage unit 22. In this way, the WUSB host 1 executes OFDM modulation on encrypted data and transmits the data to the WUSB device 2 through the antennas 15 and 25. Then, the WUSB device 2 executes OFDM demodulation on the received data to decrypt the encrypted data. In this way, the WUSB device 2 reproduces data transmitted from the WUSB host 1.

Subsequently, referring to FIGS. 1 and 2, a method of sharing a connection key CK between the WUSB host 1 and the WUSB device 2 is described below.

Figure 2:
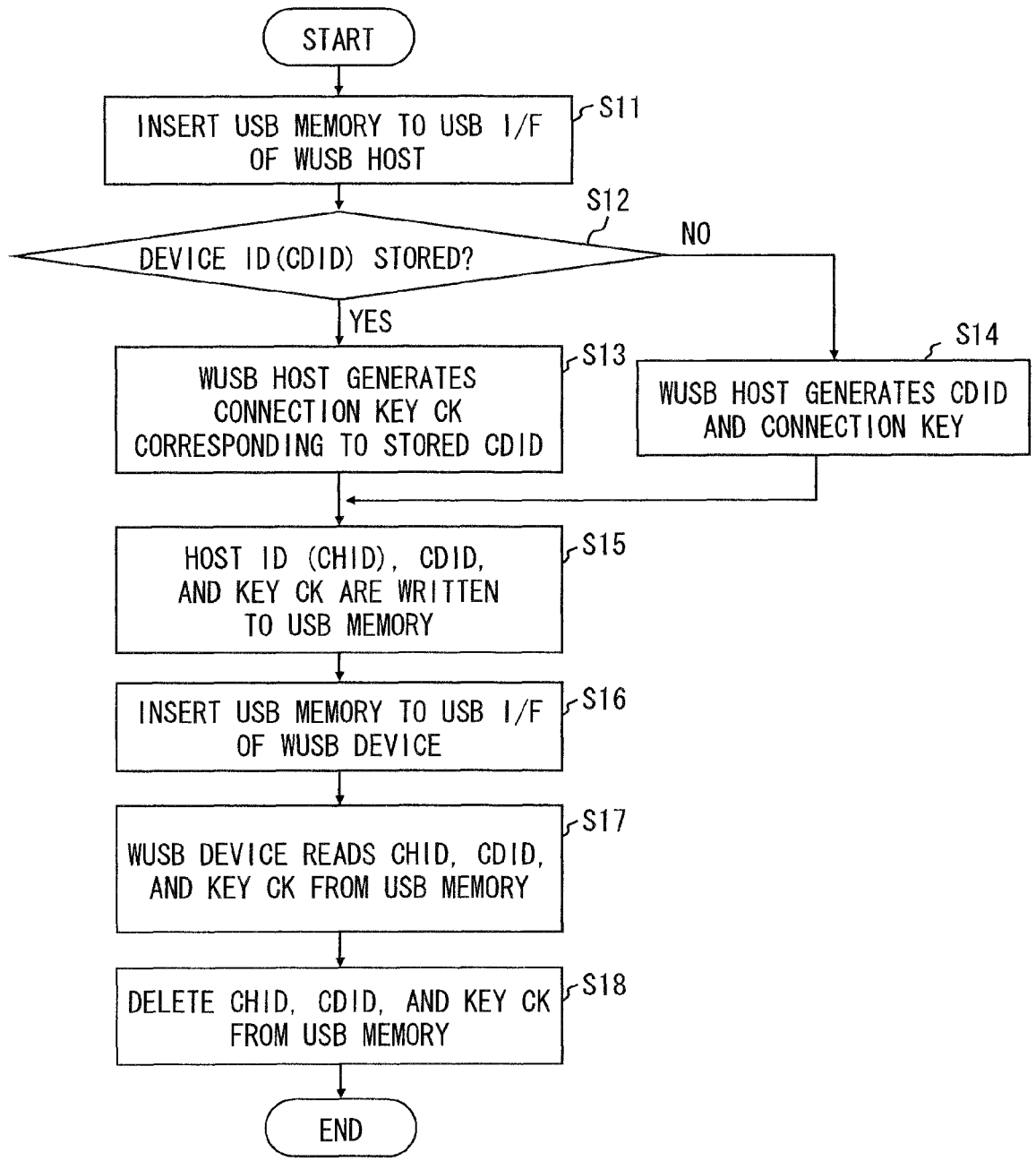
FIG. 2 is a flowchart of operations of the wireless communication system of the first embodiment.

FIG. 2 is a flowchart of the method of sharing the connection key CK between the WUSB host 1 and the WUSB device 2. First, in step S11, the USB memory 3 of FIG. 1 is inserted to an available receptacle of the USB I/F 14 of the WUSB host 1.

Here, the USB memory 3 may be a nonvolatile memory such as a flash memory. Alternatively, a commercial available general USB memory or a cryptography key-specific memory for carrying a cryptography key may be used as the USB memory 3. If the cryptography key-specific memory is used, it is possible to take a measure for setting a password for increasing a safety level and restricting an access to the cryptography key-specific USB memory unless a correct password is input. That is, when the cryptography key-specific USB memory is inserted into an available receptacle of the USB I/F 14, the cryptography key processing unit 11 determines whether or not the inserted USB memory 3 is a cryptography key-specific USB memory. In the case where it is determined that the memory is a cryptography key-specific USB memory, a message for requiring an operator to enter a password is displayed on a display device (not shown) of the WUSB host 1. If the operator enters a correct password, step S12 and its subsequent steps are performed. On the other hand, the input password is invalid, step S12 is skipped, and the cryptography key processing unit 11 displays a warning on a display device (not shown), for example. Incidentally, the above step of setting a password is not inevitable for the communication system of this embodiment, and is appropriately performed in accordance with applications.

Incidentally, in order to confirm that the cryptography key-specific USB memory 3 is inserted to the USB host 1, ID information such as serial number for identifying the USB memory 3 is prestored in the USB memory 3, and the ID information such as serial number stored in the USB memory 3 is checked against ID information stored in the cryptography key processing unit 11.

Next, in step S12, it is determined whether a device ID (CDID) is stored in the USB memory 3 of the cryptography key processing unit 11. Here, if it is determined that a CDID is not stored, in step S14, a new CDID assigned to the WUSB device 2 of the cryptography key processing unit 11 and a corresponding connection key CK are generated. On the other hand, if it is determined that a CDID is stored in the USB memory 3, in step S13, the WUSB host 1 acquires a CDID stored in the USB memory 3 and stores the CDID in the cryptography key storage unit 12, and the cryptography key processing unit 11 generates a connection key CK corresponding to the CDID.

Incidentally, in the WUSB communication system of this embodiment, a control table 121 that stores the CDID and the connection key CK in association with each other is stored in the cryptography key storage unit 12 of the WUSB host 1. On the other hand, a control table 221 that associates the host ID (CHID), the CDID, and the connection key CK with one another is stored in the cryptography key storage unit 22 of the WUSB device 2. FIG. 3A shows a specific example of the control table 121. For example, a CDID_11 assigned to one WUSB device 2 and a connection key CK_11 corresponding to the CDID_11 are associated with each other in the control table 121. The WUSB host 1 generates a connection key CK for each WUSB device 2. Therefore, the WUSB host 1 associates CDIDs assigned to the plural WUSB devices 2 with connection keys CK by use of the control table 121.

On the other hand, FIG. 3B shows a specific example of the control table 221. The WUSB host 1 can communicate with one WUSB device 2 at a time, and can switchably communicate with plural WUSB devices. Thus, the WUSB device 2 includes the control table 221 that associates the CHID, the CDID, and the connection key CK with one another as shown in FIG. 3B. For example, if the WUSB host 1 with a CHID_11 assigns the CDID_11 to the WUSB device 2, the CHID_11 and a connection key CK_11 corresponding to the CDID_11 are associated with each other in the control table 221. If plural WUSB hosts 1 are provided and switchably communicate with the WUSB device 2, the WUSB device 2 quickly identifies a corresponding WUSB host 1 to ensure security with reference to the control table 221 of FIG. 3B.

Referring back to FIG. 2, in step S15, the WUSB host 1 writes the CHID, the CDID, and the connection key CK to the USB memory 3. In step S16, the USB memory 3 that stores CHID, the CDID, and the connection key CK in step S15 is removed from the receptacle of the USB host 1 and inserted into an available receptacle of the USB I/F 24 of the WUSB device 2.

Subsequently, in step S17, the cryptography key processing unit 21 of the WUSB device 2 automatically detects that the USB memory 3 is inserted into the receptacle to automatically read the CHID, the CDID, and the connection key CK from the USB memory 3 and store the read data in the cryptography key storage unit 22. Incidentally, in order that the USB device 2 automatically detects that the USB memory 3 for transferring the CHID, the CDID, and the connection key CK is inserted, ID information such as serial number for identifying the USB memory 3 is prestored in the USB memory 3, and the ID information such as serial number stored in the USB memory 3 is checked against ID information of the cryptography key processing unit 21.

Finally, in step S18, the cryptography key processing unit 21 deletes the CHID, the CDID, and the connection key CK from the USB memory 3. As a result, even if the USB memory 3 is stolen by someone, the USB memory 3 does not record cryptography key data, so security is maintained.

As described above, in the WUSB communication system of this embodiment, when the USB memory 3 as a nonvolatile memory is physically inserted to a standard interface conforming to the USB2.0 standards, which is provided in the WUSB host 1 and the WUSB device 2, the connection key CK is written/read to/from the USB memory 3. Hence, the WUSB communication system of this embodiment can safely deliver the connection key CK as a master key between the WUSB host 1 and the WUSB device 2. That is, an operator directly inserts/removes the USB memory 3 to thereby deliver a cryptography key between the WUSB host 1 and the WUSB device 2, making it possible to prevent decryption of the cryptography key due to radio intercept, spoofing, and tampering of the cryptography key.

Further, a conventional method of transferring a cryptography key with a communication mode such as an infrared or optical communication mode where light travels in a straight line, or with weak radio waves as disclosed in Japanese Unexamined Patent Application Publication No. 2003-283481 requires a special interface for infrared or optical communication, which causes an increase in circuit size and cost. In contrast, in this embodiment, the USB memory 3 is inserted/removed to/from the WUSB host 1 and the WUSB device 2 by use of a standard interface such as a USB I/F fitted in the WUSB host 1 and the WUSB device 2 as standard equipment, so any special connector or receptacle for transmitting a cryptography key is unnecessary. Further, the USB memory 3 can be easily inserted/removed to/from the WUSB host 1 and the WUSB device 2. This embodiment excels in operability.

Further, in this embodiment, if the USB memory 3 is inserted to the WUSB host 1 or the WUSB device 2, the device automatically detects the inserted USB memory 3, and the cryptography key processing units 11 and 21 can automatically write/read the CHID, the CDID, and the connection key CK to/from the USB memory 3 in response to a detection signal. Thus, operability of the wireless communication apparatus of this embodiment, that is, the WUSB host 1 and the WUSB device 2 is considerably improved.

Second Embodiment

In the commercialization stage of WUSB, existing wired USB devices conforming to the USB1.0 or USB2.0 standards, that is, a wired USB host and a wired USB device are upgraded to WUSB devices, with the result that limitations on wired cable are circumvented to increase convenience of wireless communications. As conceivable configuration suitable for the commercialization stage, an adaptor for WUSB communications is connected with the wired USB host and the wired USB device. To be specific, the wired USB host is connected with a WUSB host/adaptor, and the wired USB device is connected with a device wire adaptor (DWA). The wired USB host and the WUSB, host/adaptor, and the wired USB device and the DWA communicate with each other based on wired USB protocol. The WUSB host/adaptor and the DWA communicate with each other by radio based on WUSB protocol. The present invention is applicable to such communication systems.

Figure 4:
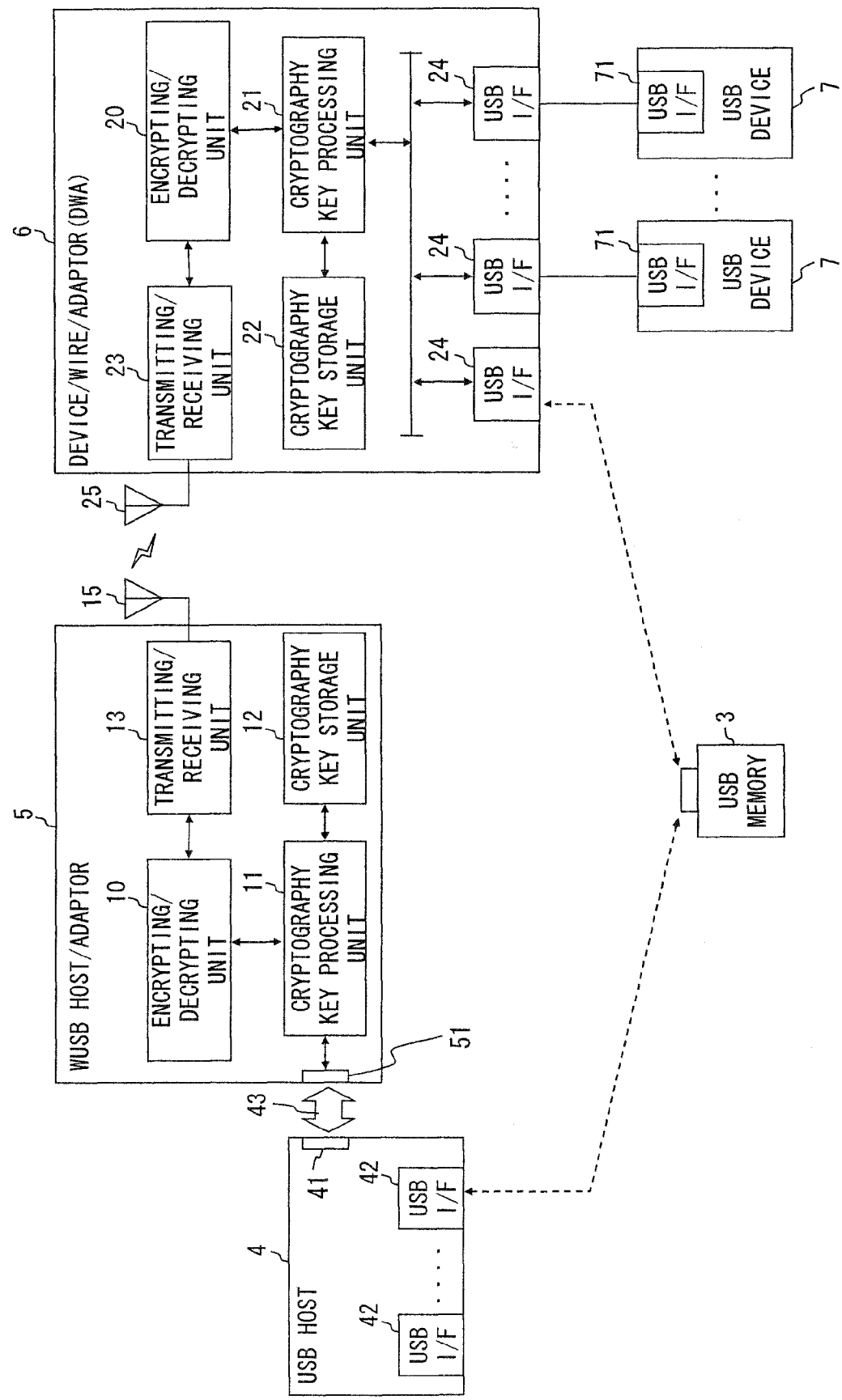
FIG. 4 is a block diagram of a wireless communication system according to a second embodiment of the present invention, which is applied to a WUSB communication system.

Referring to FIG. 4, the above WUSB communication system of this embodiment is described. FIG. 4 is a block diagram of the WUSB communication system of this embodiment. In FIG. 4, the WUSB host/adaptor 5 and the DWA 6 are used to wirelessly connect between the wired USB host 4 and the wired USB device 7 via a WUSB.

In FIG. 4, the wired USB host 4 is a USB host conforming to the USB2.0 standards. The host includes at least one USB interface (USB I/F) 42 conforming to the USB2.0 standards. Further, the wired USB host 4 includes a wired interface such as a PCI interface 41.

The WUSB host/adaptor 5 operates as a WUSB host. The encrypting/decrypting unit 10, the cryptography key processing unit 11, the cryptography key storage unit 12, the transmitting/receiving unit 13, and the antenna 15 of the WUSB host/adaptor 5 are the same as those of the WUSB host 1 of the first embodiment, and detailed description thereof is omitted here. Further, the WUSB host/adaptor 5 includes an interface such as a PCI interface 51 and is connected with the wired USB host 4 through a PCI bus 43 or the like.

The DWA 6 operates as a WUSB device. The encrypting/decrypting unit 20, the cryptography key processing unit 21, the cryptography key storage unit 22, the transmitting/receiving unit 23, USB I/F 24, and the antenna 25 of the DWA 6 are the same as the components of the WUSB device 2 of the first embodiment, so its detailed description is omitted here.

The wired USB device 7 operates as a USB device conforming to the USB2.0 standards. The device includes at least one USB interface (USB I/F) 71 conforming to the USB2.0 standards.

Even in the thus-configured WUSB communication system, the process of transmitting the connection key CK similar to that of the first embodiment as shown in FIG. 2 is carried out, making it possible to prevent decryption of the cryptography key due to radio intercept, spoofing, and tampering of the cryptography key.

Further, in the WUSB communication system of this embodiment, the WUSB host/adaptor 5 is not provided with a USB I/F to which the USB memory 3 is inserted, and the USB memory 3 is inserted to the USB I/F 42 of the wired USB host 4 connected with the WUSB host/adaptor 5 to transmit a connection key CK. That is, the cryptography key processing unit 11 of the WUSB host/adaptor 5 determines whether or not the USB memory 3 inserted into the USB I/F 42 is a cryptography key-specific USB memory based on ID information such as serial number, detects a CDID, and writes a CHID, a CDID, and a connection key. Owing to such configuration, it is unnecessary to add a USB I/F to the WUSB host/adaptor 5, and the WUSB host/adaptor 5 can be downsized.

Incidentally, in the above description, the WUSB host/adaptor 5 is connected with the wired USB host 4 through the PCI bus 43, as an external device of the wired USB host 4. However, for example, the WUSB host/adaptor 5 may be incorporated into a PC card, and inserted into a PC card slot of the wired USB host 4 and connected through a CardBus. Further, the WUSB host/adaptor 5 and the wired USB host 4 may be connected via a USB I/F. That is, the WUSB host/adaptor 5 and the wired USB host 4 may be connected via the above PCI, PC card, USB2.0, or other such electric interfaces as appropriate.

Third Embodiment

Figure 5:
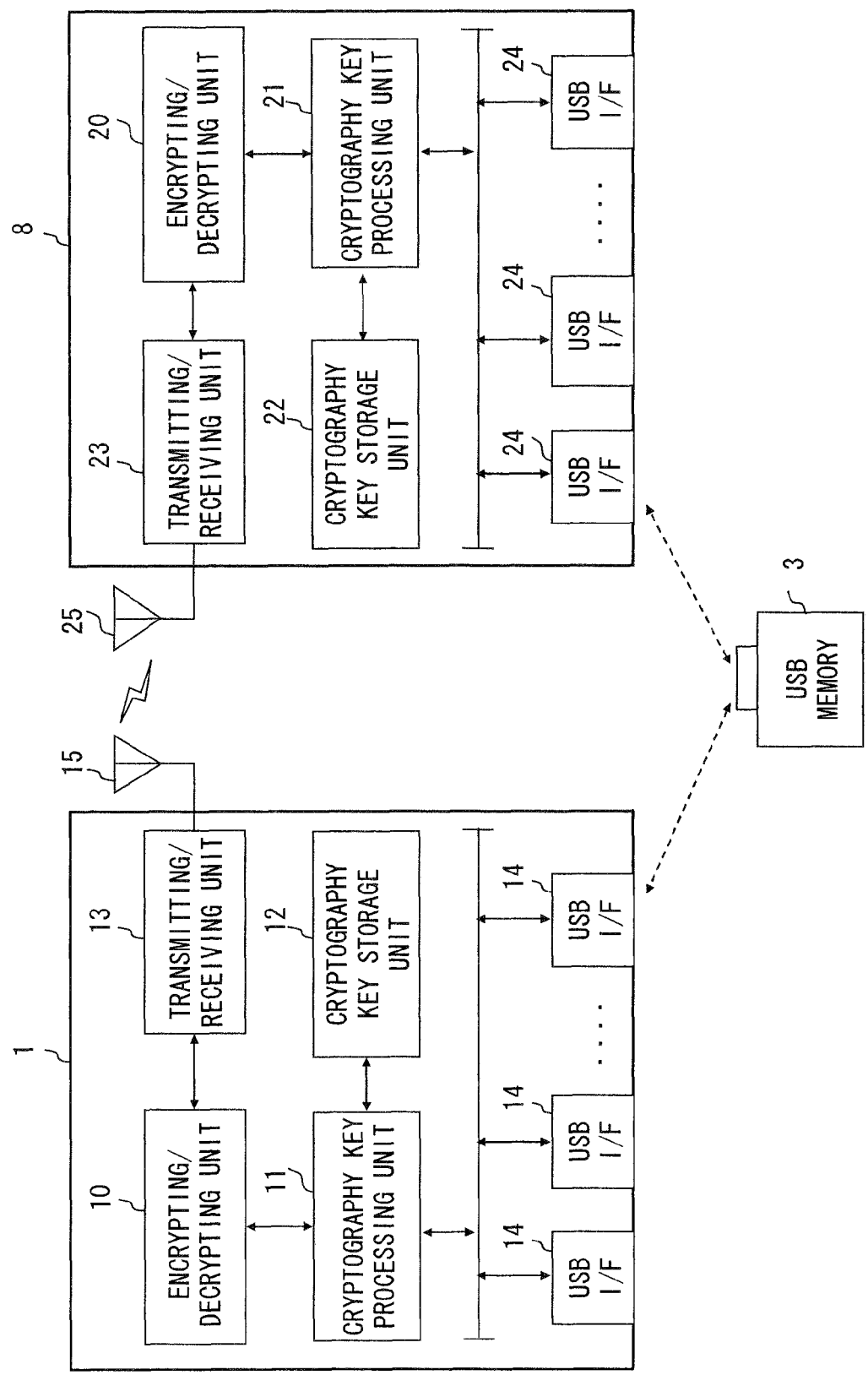
FIG. 5 is a block diagram of a wireless communication system according to a thirdembodiment of the present invention.

FIG. 5 shows the configuration of a WUSB communication system according o a third embodiment of the present invention. The WUSB communication system of this embodiment includes the WUSB host 1, the WUSB device 8, and the USB memory 3. The WUSB communication system of this embodiment has a feature that at the time of transmitting a connection key CK from the WUSB host 1 to the WUSB device 8, the USB memory 3 is inserted/removed three times in total in the following order: the WUSB device 8, the WUSB host 1, and the WUSB device 8.

The cryptography key processing unit 81 of the WUSB device 8 has a function of storing a CHID and a CDID stored in the control table 211, in the USB memory 3 as well as a function of the cryptography key processing unit 21 of the first embodiment. Incidentally, the other components of the WUSB device 8 are the same as those of the WUSB device 2 of the first embodiment.

Figure 6:
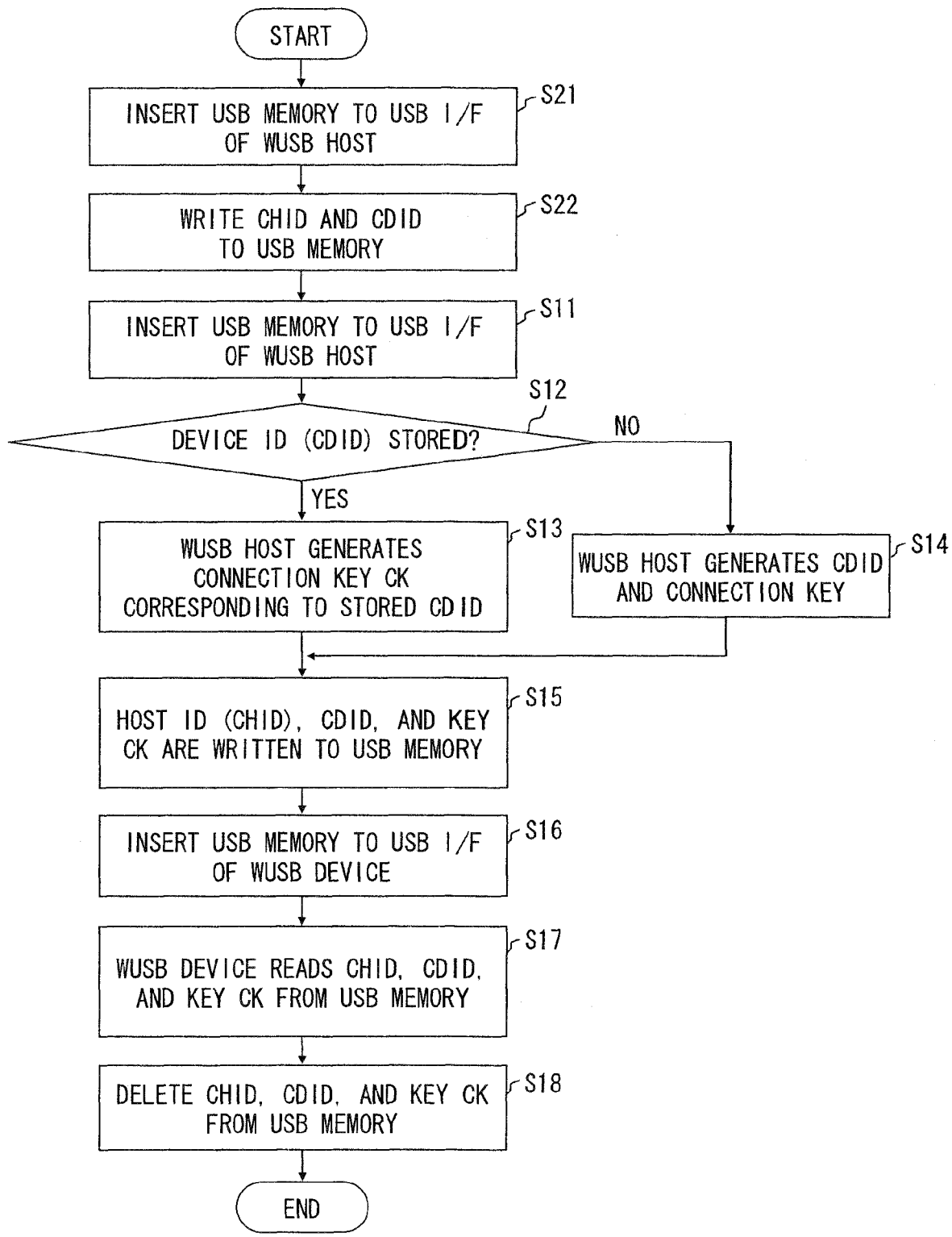
FIG. 6 is a flowchart of operations of the wireless communication system of the third embodiment.

FIG. 6 is a flowchart of a method of sharing a connection key CK between the WUSB host 1 and the WUSB device 8. First, in step S21, the USB memory 3 is inserted into an available receptacle of the USB I/F 24 of the WUSB device 8.

Next, in step S22, the cryptography key processing unit 81 stores a pair of CHID and CDID held in the control table 211 of FIG. 3B in the USB memory 3. Steps subsequent to the step S22 are the same as steps S11 to S18 of the first embodiment of FIG. 2.

As described above, in this embodiment, the USB memory 3 is first inserted into the WUSB device 8, and a CHID and a CDID held in the WUSB device 8 are written to the USB memory 3. Therefore, in step S12, the cryptography key processing unit 11 reads a CDID stored in the USB memory 3 and determines whether or not the CDID stored in the USB memory 3 matches with the CDID stored in the control table 121. If matched, in step S13, a connection key CK corresponding to the CDID stored in the USB memory 3 is generated to update the control table 121. On the other hand, if it is determined that the CDID stored in the USB memory 3 does not match with the CDID stored in the control table 121 in step S12, a new CDID and connection key CK are generated in step S14 and added to the control table 121 in association with each other.

In this embodiment, in the case of transmitting a connection key CK from the WUSB host 1 to the WUSB device 8, the USB memory 3 is inserted/removed three times in total, with respect to the WUSB device 8, the WUSB host 1, and the WUSB device 8 in this order. Therefore, as compared with two of the first embodiment, in this embodiment, the USB memory 3 is inserted/removed one more time. However, the CDID stored in the WUSB device 8 is input to the WUSB host 1 to thereby update the connection key CK without generating a new CDID to the WUSB device 8 that has been already assigned with a CDID. As a result, it is possible to prevent the number of CDIDs added to the control table 121 from increasing and to efficiently manage associations between the CDID and the connection key CK in the control table 121.

Needless to say, similar to the third embodiment, the USB memory 3 may be inserted/removed three times to transmit a connection key CK even in the WUSB communication system including a WUSB host/adaptor and a DWA according to the second embodiment.

Other Embodiment

In the first to third embodiment, the USB memory 3 is used as a nonvolatile memory storing a CDID and a connection key CK. However, it is possible to provide any portable nonvolatile memory connectable with the WUSB host 1, the WUSB devices 2 and 8, the wired USB host 4, and the DWA 6 through an electric interface other than the USB I/F.

Further, the above first to third embodiments describe a WUSB communication system to which the present invention is applied. However, applications of the present invention are not limited to the WUSB communication system. That is, the present invention is widely applicable to wireless communication systems that need to exchange a so-called cryptography key used for encrypting/decrypting communication data to share the key between two wireless communication apparatuses that communicate with each other by radio.

It is apparent that the present invention is not limited to the above embodiment but may be modified and changed without departing from the scope and spirit of the invention.

What is claimed is:

1. A wireless communication system, comprising:
a first communication apparatus; and a second communication apparatus that transmits/receives encrypted communication data to/from the first communication apparatus by radio,
the first communication apparatus comprising: a first encrypting/decrypting unit encrypting the communication data and decrypting the encrypted communication data;
a first interface unit electrically connectable with a portable nonvolatile memory, to which the nonvolatile memory can be physically removably inserted; and
a first cryptography key processing unit generating a temporary cryptography key used for encrypting/decrypting the communication data and a master cryptography key for generating the temporary cryptography key, and
the second communication apparatus comprising: a second encrypting/decrypting unit encrypting the communication data and decrypting the encrypted communication data;
a second interface unit electrically connectable with the nonvolatile memory, to which the nonvolatile memory storing the master cryptography key is physically removably inserted; and
a second cryptography key processing unit generating the temporary cryptography key based on the master cryptography key read from the nonvolatile memory connected with the second interface unit,
wherein the first communication apparatus includes a first cryptography key storage unit storing the master cryptography key and the temporary cryptography key,
the second communication apparatus includes a second cryptography key storage unit storing the master cryptography key and the temporary cryptography key,
the first cryptography key storage unit stores identification (ID) information of the second communication apparatus and the master cryptography key in association with each other, and the second cryptography key storage unit stores ID information of the first communication apparatus, ID information of the second communication apparatus, and the master cryptography key in association with one another, the second communication apparatus is able to write ID information of the first communication apparatus and ID information of the second communication apparatus held in the second cryptography key storage unit to the nonvolatile memory connected with the second interface unit, and upon ID information of the second communication apparatus generated by the first communication apparatus being stored in the nonvolatile memory connected with the first interface unit, the first communication apparatus generates the master cryptography key corresponding to ID information of the second communication apparatus stored in the nonvolatile memory without generating new ID information, and stores the generated master cryptography key in the first cryptography key storage unit, and upon ID information of the second communication apparatus generated by the first communication apparatus not being stored in the nonvolatile memory connected with the first interface unit, the first communication apparatus generates new ID information assigned to the second communication apparatus and the master cryptography key corresponding to the new ID information to store the new ID information and the master cryptography key in the first cryptography key storage unit.

2. The wireless communication system according to claim 1, wherein the first interface unit and the second interface unit are standardized interfaces.

3. The wireless communication system according to claim 2, wherein the standardized interfaces are USB (Universal Serial Bus) interfaces.

4. The wireless communication system according to claim 3, wherein the first communication apparatus is a WUSB (Wireless USB) host, and the second communication apparatus is a WUSB device.

5. The wireless communication system according to claim 1, wherein the first communication apparatus includes:
 a wired communication apparatus including the first interface unit; and
 a wireless communication apparatus including the first encrypting/decrypting unit and the first cryptography key processing unit and wired to the wired communication apparatus.

6. A method of exchanging a cryptography key to share a master cryptography key for generating a temporary cryptography key for encrypting/decrypting communication data between a first communication apparatus and a second communication apparatus that transmit/receive encrypted communication data by radio, comprising:
 generating the master cryptography key with the first communication apparatus;
 storing the generated master cryptography key in a portable nonvolatile memory physically connected to the first communication apparatus; and
 reading the master cryptography key from the nonvolatile memory physically connected to the second communication apparatus with the second communication apparatus after the nonvolatile memory is removed from the first communication apparatus,
 wherein the first communication apparatus stores the master cryptography key and identification (ID) information of the second communication apparatus in association with each other, and writes ID information of the second communication apparatus corresponding to the master cryptography key and ID information of the first communication apparatus to the nonvolatile memory upon storing the master cryptography key to the nonvolatile memory,
 the second communication apparatus reads the master cryptography key, ID information of the first communication apparatus, and ID information of the second communication apparatus stored in the nonvolatile memory and stores the master cryptography key, the ID information of the first communication apparatus, and the ID information of the second communication apparatus in association with one another,
 prior to generation of the master cryptography key with the first communication apparatus, the second communication apparatus writes the stored ID information of the first communication apparatus and the stored ID information of the second communication apparatus to the nonvolatile memory physically connected to the second communication apparatus, and
 upon ID information of the second communication apparatus generated by the first communication apparatus being stored in the nonvolatile memory, the first communication apparatus generates the master cryptography key corresponding to ID information of the second communication apparatus stored in the nonvolatile memory without generating new ID information, and stores the generated master cryptography key in association with ID information of the second communication apparatus stored in the nonvolatile memory, and upon ID information of the second communication apparatus generated by the first communication apparatus not being stored in the nonvolatile memory, the first communication apparatus generates new ID information assigned to the second communication apparatus, and the master cryptography key corresponding to the new ID information, and stores the new ID information and the master cryptography key in association with each other.

7. The method of exchanging a cryptography key according to claim 6, wherein the second communication apparatus reads the master cryptography key from the nonvolatile memory and then deletes the master cryptography key stored in the nonvolatile memory.

8. A wireless communication apparatus transmitting/receiving encrypted communication data by radio, comprising:
 a first encrypting/decrypting unit encrypting the communication data and decrypting the encrypted communication data;
 a first interface unit electrically connectable with and physically removably attached to a nonvolatile memory;
 a first cryptography key processing unit generating a master cryptography key for generating a temporary cryptography key for encrypting/decrypting the communication data;
 a writing unit writing the generated master cryptography key to the nonvolatile memory connected with the first interface unit; and
 a first cryptography key storage unit storing the master cryptography key and the temporary cryptography key,
 wherein upon identification (ID) information of a second wireless communication apparatus communicating with the first cryptography key processing unit being stored in the nonvolatile memory connected to the first interface unit, the first cryptography key processing unit generates the master cryptography key corresponding to ID information of the second communication apparatus stored in the nonvolatile memory without generating new ID information, and upon ID information of the second communication apparatus not being stored in the nonvolatile memory connected with the first interface unit, the first cryptography key processing unit generates new ID information assigned to the second wireless communication apparatus and the master cryptography key corresponding to the new ID information, and wherein the first cryptography key storage unit stores ID information of the second wireless communication apparatus and the master cryptography key in association with each other.

9. The wireless communication apparatus according to claim 8, wherein the first cryptography key processing unit prestores ID information of the nonvolatile memory, and checks ID information of a device connected with the first interface unit against the prestored ID information of the nonvolatile memory to detect that the nonvolatile memory is connected to the first interface unit to write the master cryptography key to the nonvolatile memory in accordance with the detection.

* * * * *